United States Patent
Hsu et al.

[11] Patent Number: 5,857,364
[45] Date of Patent: Jan. 12, 1999

[54] TWO-WAY LOCK MECHANISM WITH CAM ACTION

[75] Inventors: Peter Hsu, Pan-chiao Ct; TB Tsai; William Chang, both of Taipei, all of Taiwan

[73] Assignee: Digital Equipment Corporation, Maynard, Mass.

[21] Appl. No.: 863,164

[22] Filed: May 27, 1997

[51] Int. Cl.$^6$ ................................................. E05B 63/14
[52] U.S. Cl. .................................................. 70/120; 70/118
[58] Field of Search ............................. 70/103, 108, 109, 70/113, 118, 120, 130, 134

[56] References Cited

U.S. PATENT DOCUMENTS

| | | | |
|---|---|---|---|
| 1,736,306 | 11/1929 | Chason | 70/120 X |
| 3,991,595 | 11/1976 | Bahry et al. | 70/120 |
| 4,037,440 | 7/1977 | Shabtai et al. | 70/120 X |
| 4,114,933 | 9/1978 | Jankelewitz et al. | 70/108 X |
| 4,306,432 | 12/1981 | Ravid | 70/120 |
| 4,362,034 | 12/1982 | Amgar | 70/120 X |
| 5,339,659 | 8/1994 | Guzzinati | 70/120 |
| 5,341,752 | 8/1994 | Hambleton | 70/118 X |
| 5,603,234 | 2/1997 | Lozier et al. | 70/120 X |
| 5,632,166 | 5/1997 | Wiersma | 70/120 |

FOREIGN PATENT DOCUMENTS

| | | | |
|---|---|---|---|
| 460147 | 2/1913 | France | 70/120 |
| 400991 | 8/1922 | Germany | 70/120 |
| 537178 | 12/1978 | Russian Federation | 70/120 |
| 218316 | 3/1942 | Switzerland | 70/120 |

*Primary Examiner*—Suzanne Dino Barrett

[57] ABSTRACT

A computer enclosure has a front bezel with two doors and a two-way lock mechanism controlling the locking of the doors. The swinging ends of the doors meet at a central portion of the bezel where the lock mechanism is located. The lock mechanism includes a guide plate located at the rear of the bezel having two guide channels that receive the bolts of the lock mechanism. A lock extends through the guide plate, and its rotatable barrel attaches to a cam plate at the rear of the bezel. The cam plate has two slots, each engaging one of the bolts. The bolts slide between withdrawn and extended positions in response to urging forces from the edges of the slots as the cam plate rotates in response to the turning of the lock, thus locking and unlocking the doors.

6 Claims, 5 Drawing Sheets

TWO-WAY LOCK MECHANISM WITH CAM ACTION

FIELD OF THE INVENTION

The invention is related to the field of lock mechanisms for cabinets such as enclosures for computers or similar electronic equipment.

BACKGROUND OF THE INVENTION

Despite the proliferation of desktop and other small computers, many computer systems continue to be housed in upright cabinets of varying sizes. The front of the computer cabinets often have one or more doors. When open, the doors provide access to internal functional equipment, such as disk drives, and when closed provide protection for the equipment, as well as an appealing outer appearance for the cabinet. The door or doors may also provide a measure of security if they are lockable.

In cabinets having two doors, the cabinet is often configured so that the swinging ends of the doors are adjacent to each other at the interior of the front of the cabinet. In such a case, a single lock may be used to control the locking of both doors. This type of lock is referred to as a "two-way" lock. A two-way lock typically has more than the two lock positions (open/locked) found on a one-way lock. For example, if each door is to be independently lockable, the lock must have 4 positions, corresponding to the 4 possible sets of lock conditions of the two doors. And like all locks, two-way locks are preferably strong and smooth-acting, while achieving the functional requirements placed on them.

SUMMARY OF THE INVENTION

The invention is, in one aspect, an improved two-way lock mechanism. The lock mechanism requires a planar support structure with an opening and two guide channels extending away from the opening. Two bolts, one for each door, are disposed in the guide channels, each bolt being slidable between a withdrawn position near the opening and an extended position further away from the opening. A lock extends through the opening and is secured to the support structure; the lock has a barrel rotatable about a rotational axis extending through the opening perpendicular to the support structure. A cam plate is attached to the barrel of the lock. The cam plate is parallel with the support structure and has two slots each engaging one of the bolts. Each bolt slides between the withdrawn and extended positions in response to urging forces exerted by the edges of the slots as the cam plate rotates in response to the turning of the lock.

In a slightly more detailed aspect, the invention is a lock mechanism with three rotational lock positions as follows: (1) a first lock position in which both of the bolts are withdrawn; (2) a second lock position in which one of the bolts is withdrawn and the other bolt is extended; and (3) a third lock position in which both of the bolts are extended. Each slot in the cam plate has three control points, each separated from its neighboring control point in the same slot by an arcuate slot portion, and each bolt engages one of the control points in each of the three lock positions. Each control point is labeled as either a first, second, or third control point in accordance with the lock position in which it engages the corresponding bolt. The slot that engages the bolt that is withdrawn in the second lock position has its first and second control points located the same distance from the rotational axis of the lock barrel, and has its third control point located further from the rotational axis than its first and second control points; the other slot has its second and third control points located substantially the same distance from the rotational axis of the lock barrel, and has its first control point located closer to the rotational axis than its second and third control points.

In another major aspect, the invention is an enclosure with a bezel having a planar central portion, an opening in the central portion, and two rectangular doorway openings adjacent to the central portion. Two doors are hingedly attached to the bezel to cover the doorway openings, the swinging ends of the doors being adjacent to the central portion of the bezel. Each door also has an opening on its swinging edge for receiving a bolt from the lock mechanism. A guide plate is situated at the rear of the central portion of the bezel. The guide plate has a planar body with an opening aligned with the opening in the central portion of the bezel, and also has two pairs of walls extending from the planar body, the walls in each pair being parallel to each other to form a guide channel extending away from the aligned openings. An L-shaped bolt is disposed in each guide channel on the guide plate. A leg portion of each bolt extends above the walls forming the guide channels, and each bolt is slidable between a withdrawn position near the aligned openings and an extended position further away from the aligned openings in which one end of the bolt engages the hole in the corresponding door. A lock extends through the aligned openings in the bezel and guide plate. The lock is secured to the bezel and guide plate, and has a barrel rotatable about a rotational axis extending through the aligned openings. A cam plate is attached to the barrel of the lock on the rear of the bezel. The cam plate is parallel with the body of the guide plate, and has two slots each receiving the leg portion of one of the bolts, so that each bolt slides between the withdrawn and extended positions in response to urging forces exerted on the leg portions by the edges of the slots as the cam plate rotates in response to the turning of the lock.

Other features of the present invention are described with reference to the detailed description that follows.

DETAILED DESCRIPTION

Figure 1:
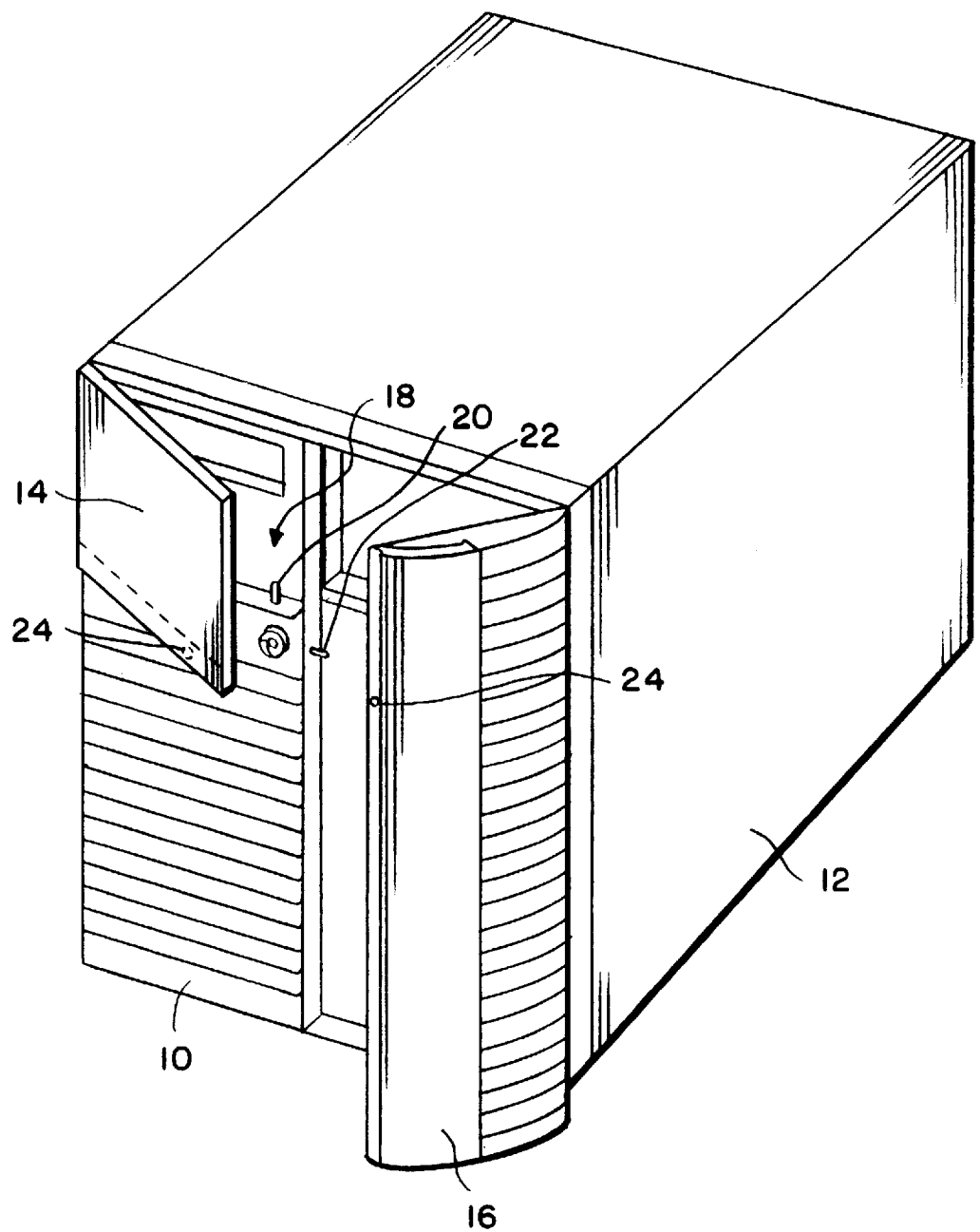
FIG. 1 is a perspective view of a computer enclosure having a lock mechanism according to the principles of the present invention.

FIG. 1 shows a computer enclosure having a lock mechanism embodying the principles of the present invention. The computer enclosure has a bezel 10 covering the front opening of a box-shaped housing 12; the bezel 10 is secured to the housing 12 via snap tabs or other conventional means. As shown, the bezel 10 has two doors allowing access to the inside of the enclosure, a drive door 14 and a "hot swap" door 16. The drive door 14 allows access to flexible disk drive units installed in the enclosure, while the hot swap door 16 allows access to a bank of removable hard disk drive units. Installed on the bezel 10 is a lock mechanism generally referred to as 18. Bolts 20, 22 of the lock mechanism engage mating holes 24 in the doors 14 and 16 to hold them closed.

Figure 2:
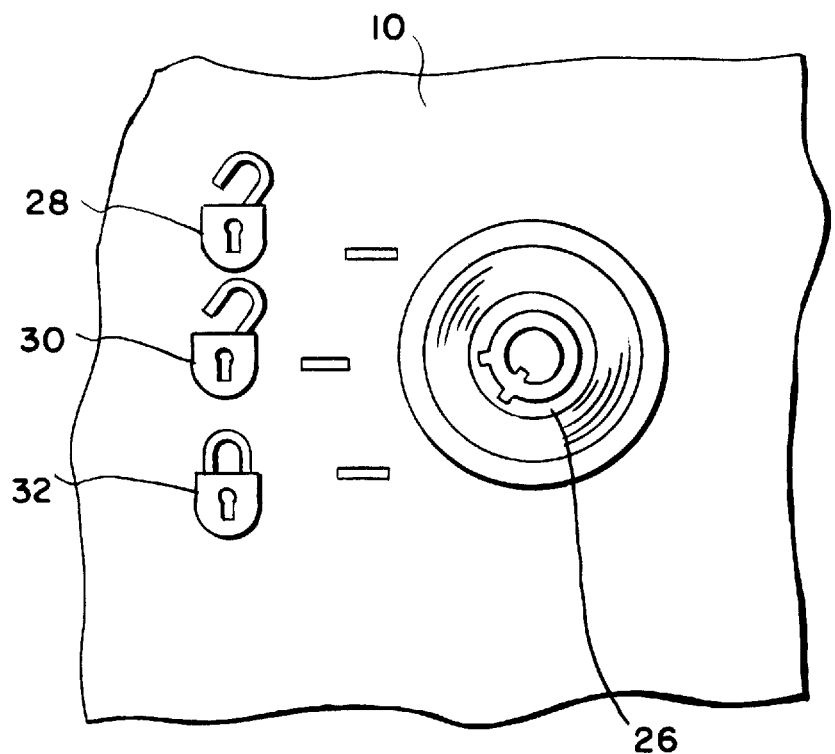
FIG. 2 is an isometric view of a front central portion of a bezel on the front of the computer enclosure of FIG. 1 where the lock mechanism is located.

FIG. 2 shows a close up view of the central front portion of the bezel 10 where the lock mechanism 18 is located. A lock 26 is part of the lock mechanism 18. There are three positions of the lock 26, as indicated by icons 28, 30, and 32. When the lock 26 is in the position corresponding to icon 28, both the doors 14 and 16 are unlocked. When the lock 26 is in the position corresponding to icon 30, the drive door 14 is unlocked, and the hot swap door 16 is locked. And when the lock 26 is in the position corresponding to icon 32, both the doors 14 and 16 are locked.

Figure 3:
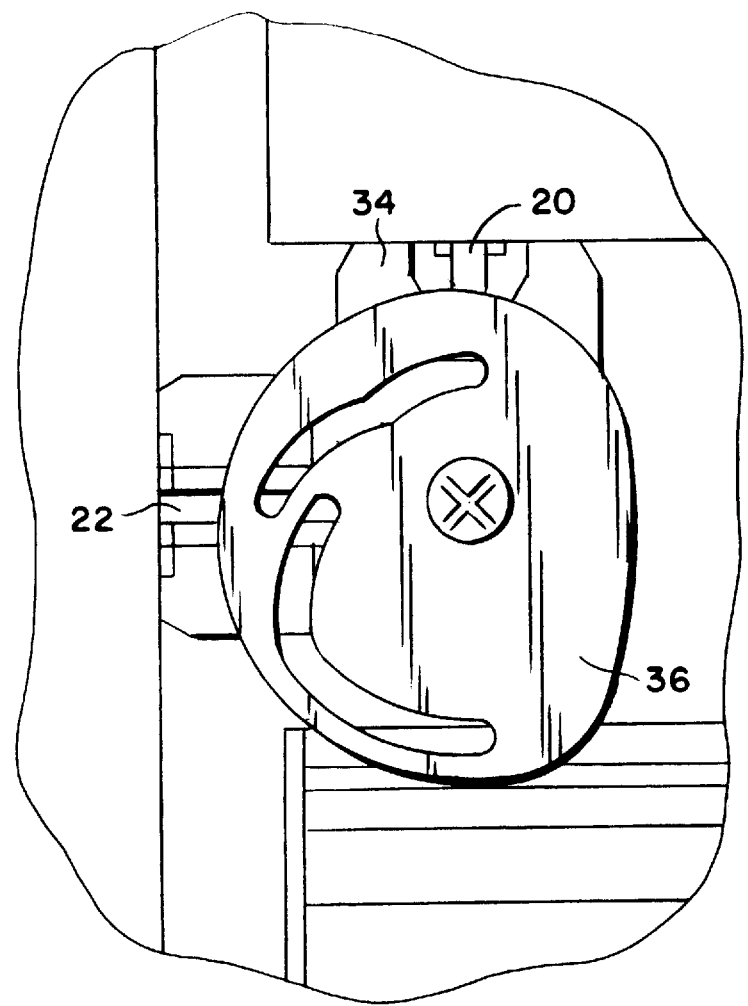
FIG. 3 is an isometric view of the rear of the central portion of the bezel where the lock mechanism is located.

FIG. 3 shows a close up view of the central rear portion of the bezel 10 where the lock mechanism 18 is located. A guide plate 34 is employed to hold and guide the bolts 20, 22. A cam plate 36 engages the bolts 20, 22 and translates the rotational motion of the lock 26 to linear sliding motion of the bolts 20, 22. The action of the cam is described in greater detail below.

Figure 4:
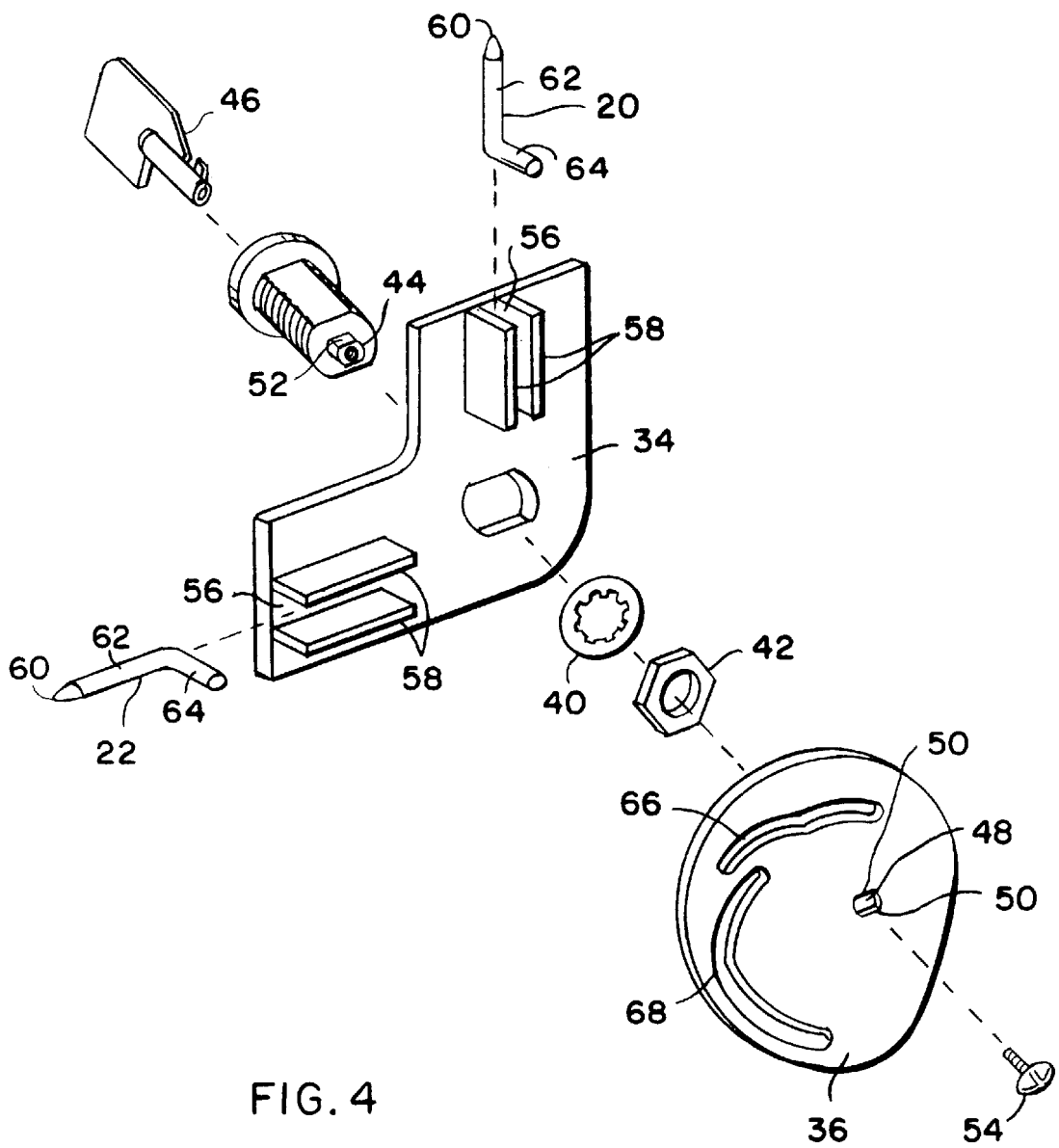
FIG. 4 is an exploded perspective view of the lock mechanism.

FIG. 4 shows an exploded view of the lock mechanism 18. The lock 26 is secured to the bezel 10 (not shown) and guide plate 34 by a lock washer 40 and nut 42. The lock 26 has a barrel 44 rotatable by a conventional key 46. The cam plate 36 has a central opening 48 for accepting the tip of the barrel 44. The opening 48 has flat portions 50 that engage corresponding flat portions 52 of the barrel 44 to provide proper registration and torque transmission. The cam plate 36 is secured to the barrel 44 by a machine screw 54. The bolts 20, 22 sit in guide channels 56 formed by parallel walls 58 extending from the body of the guide plate 34. The bolts 20, 22 have tapered tips 60 to more easily engage the holes 24 in the doors 14, 16. As shown, the bolts 20, 22 are L-shaped, each having a body portion 62 and slightly shorter leg portion 64. The body portions 62 slide in the guide channels 56 and engage the corresponding holes 24 in the doors 14, 16; the leg portions 64 engage corresponding slots 66 and 68 formed in the cam plate 36.

Figure 5:
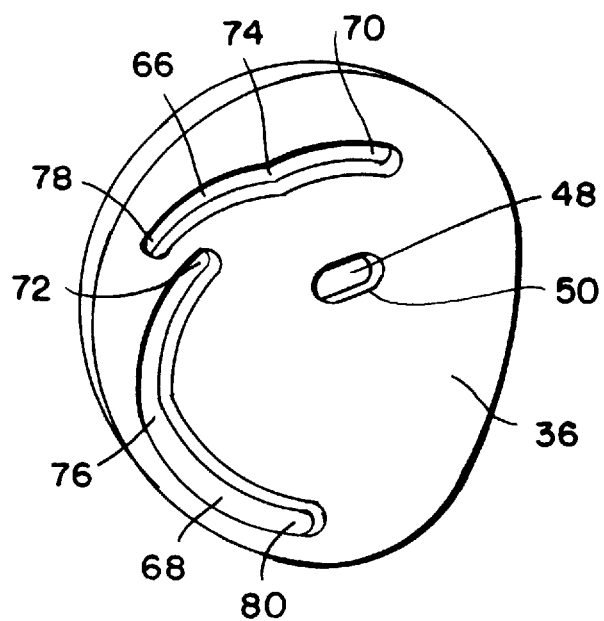
FIG. 5 is a perspective view of a cam plate that is part of the lock mechanism.

FIG. 5 shows the cam plate 36 in isolation. Each slot 66, 68 has three control points which correspond to the three lock positions described above with reference to FIG. 2; the control points are separated by arcuate portions along which the leg portions 64 of the bolts 20, 22 travel between control points. First control points 70, 72 each engage the corresponding bolt 20, 22 when the lock 26 is in the position corresponding to icon 28 of FIG. 2. The first control points 70, 72 are located at a distance from the opening 48 such that both bolts 20 and 22 are withdrawn from the holes 24 when the lock 26 is in this position. Thus in this first lock position, both doors 14, 16 are unlocked.

Second control points 74, 76 each engage the corresponding bolt 20, 22 when the lock 26 is in the position corresponding to icon 30 of FIG. 2. The second control point 74 in slot 66 is located the same distance from the opening 48 as is the first control point 70 in that slot. Thus bolt 20, which engages slot 66, remains withdrawn in the second lock position. Second control point 76 in slot 68, however, is located further from opening 48 than is the first control point 72 in that slot. Thus as the cam plate 36 rotates from the first position to the second position, bolt 22, which engages slot 68, is pushed out to an extended position. As a result, the hot swap door 16 is locked in the second lock position, while the drive door 14 remains unlocked.

Finally, third control points 78, 80 each engage the corresponding bolt 20, 22 when the lock 26 is in the position corresponding to icon 32 of FIG. 2. The third control point 80 in slot 68 is located the same distance from the opening 48 as is the second control point 76 in that slot. Thus bolt 22 remains extended in the third lock position. Third control point 78 in slot 66, however, is located further from the opening 48 than are the first and second control points 70, 74 in that slot. Thus as the cam plate 36 rotates from the second position to the third position, bolt 20 is pushed out to an extended position. As a result, both the hot swap door 16 and the drive door 14 are locked in the third lock position.

The foregoing has described a particular embodiment of the invention; there are of course other possible embodiments that will be apparent to those skilled in the art. For example, in alternative embodiments requiring four lock positions instead of three, the slots on the cam plate can be configured to have four control points in a fashion analogous to the illustrated configuration having three. Likewise, the slots may also be configured to achieve sequences of lock positions that differ from the sequence achieved by the slots in the illustrated cam plate. It would be possible to dispense with a separate guide plate in the support structure if, for example, the bezel could be formed sufficiently strong and configured to have the necessary guide channels. Still other embodiments are possible that are intended to be described by the claims which follow.

We claim:

1. A lock mechanism, comprising:

a planar support structure having an opening and two guide channels extending away from the opening on one side of the support structure;

two bolts each disposed in a corresponding one of the guide channels on the support structure, each bolt being slidable between a withdrawn position near the opening in the support structure and an extended position further away from the opening;

a lock extending through the opening and secured to the support structure, the lock having a barrel rotatable about a rotational axis extending through the opening perpendicular to the support structure; and a cam plate attached at a central portion thereof to the barrel of the lock on the same side of the support structure as the guide channels, the cam plate being parallel with the support structure and having means forming two slots each slot engaging a corresponding one of the bolts, the means forming each slot being formed by two distinct intersecting arcuate slot portions, the intersection of the two distinct intersecting arcuate slot portions of one of said slot forming means being a withdrawn position of said corresponding bolt, the intersection of the two distinct intersecting arcuate slot portions of the other of said slot forming means being an extended position of said corresponding bolt, one end of one slot forming means being a first stop position and an extended position of each bolt, the other end of said one slot forming means being a second stop position and a withdrawn position of each bolt, said slot forming means being configured such that each bolt slides from one position to another in response to urging forces exerted by said means forming the slots as the cam plate rotates.

2. A lock mechanism according to claim 1, wherein each bolt is an L-shaped member having a body portion and a leg portion, the body portion of the member disposed in the corresponding guide channel, the leg portion of the member engaging the corresponding slot in the cam plate.

3. A lock mechanism according to claim 1, wherein the axes along which the bolts slide are mutually perpendicular.

4. A lock mechanism comprising:

a planar support structure having an opening and two guide channels extending away from the opening on one side of the support structure;

two bolts each disposed in a corresponding one of the guide channels on the support structure, each bolt being slidable between a withdrawn position near the opening in the support structure and an extended position further away from the opening;

a lock extending through the opening and secured to the support structure, the lock having a barrel rotatable about a rotational axis extending through the opening perpendicular to the support structure; and a cam plate attached at a central portion thereof to the barrel of the lock on the same side of the support structure as the guide channels, the cam plate being parallel with the support structure and having means forming two slots each slot engaging a corresponding one of the bolts, said slot forming means being configured such that each bolt slides between the withdrawn and extended positions in response to urging forces exerted by said slot forming means as the cam plate rotates, wherein:

the lock mechanism has three rotational positions as follows: (1) a first lock position in which both of the bolts are withdrawn; (2) a second lock position in which one of the bolts is withdrawn and the other bolt is extended; and (3) a third lock position in which both of the bolts are extended;

each slot forming means in the cam plate has three control points radially displaced from the rotational axis of the lock barrel;

each bolt engages a corresponding one of the three control points in the corresponding slot forming means in each of the three lock positions, each control point in each slot forming means being labeled as either a first, second, or third control point in accordance with the corresponding lock position in which said control point engages the corresponding bolt;

the first and second control points and the second and third control points of each slot forming means being separated by a corresponding arcuate slot portion;

the radial displacement of the first and second control points of the slot forming means engaging the bolt that is withdrawn in the second lock position being substantially the same and the radial displacement of the third control point of said slot forming means being greater than the radial displacement of the first and second control points; and the radial displacement of the second and third control points of the other slot forming means being substantially the same and the radial displacement of the first control point of said slot forming means being less than the radial displacement of the second and third control points.

5. A lock mechanism according to claim 4, wherein the axes along which the bolts slide are mutually perpendicular.

6. An enclosure, comprising:

a bezel having a planar including a front and a rear, an opening in the central portion, and two rectangular doorway openings adjacent to the central portion;

two doors each having a hinged end and a swinging end, each hingedly attached to the bezel to cover a corresponding one of the doorway openings, both doors being attached so that their respective swinging end are adjacent to the central portion of the bezel, each door having an opening on its respective swinging end for receiving a lock bolt;

a guide plate at the rear of the central portion of the bezel, the guide plate having a planar body with an opening aligned with the opening in the central portion of the bezel, the guide plate also having two pairs of walls extending from the planar body, the walls in each pair being parallel to each other and forming a corresponding guide channel extending away from the aligned openings;

two L-shaped bolts each disposed in a corresponding one of the guide channels on the guide plate so that a leg portion of each bolt extends above the walls forming the corresponding guide channel, each bolt being slidable between a withdrawn position near the opening in the support structure and an extended position further away from the opening in which one end of the bolt engages the hole in the corresponding one of the doors;

a lock extending through the aligned openings in the bezel and guide plate and being secured to the bezel and guide plate, the lock having a barrel rotatable about a rotational axis extending through the aligned openings; and a cam plate attached at a central portion thereof to the barrel of the lock on the rear of the bezel, the plane of the cam plate being parallel with the planar body of the guide plate and having means forming two slots each receiving the leg portion of a corresponding one of the bolts, each bolt sliding between the withdrawn and extended positions in response to urging forces exerted on the leg portions thereof by the means forming the slots as the cam plate rotates.

* * * * *

UNITED STATES PATENT AND TRADEMARK OFFICE
CERTIFICATE OF CORRECTION

PATENT NO. : 5,857,364
DATED : January 12, 1999
INVENTOR(S) : Peter Hsu, TB Tsai and William Chang It is certified that error appears in the above-indentified patent and that said Letters Patent is hereby corrected as shown below:

In column 6, line 10 of claim 6, after "planar" insert --central portion--.

Signed and Sealed this

Eighth Day of June, 1999

Attest:

Q. TODD DICKINSON

*Attesting Officer*     Acting Commissioner of Patents and Trademarks